April 15, 1941.                R. E. McINTOSH                2,238,179
                            ADJUSTABLE ENGINE MOUNT
                              Filed June 23, 1939
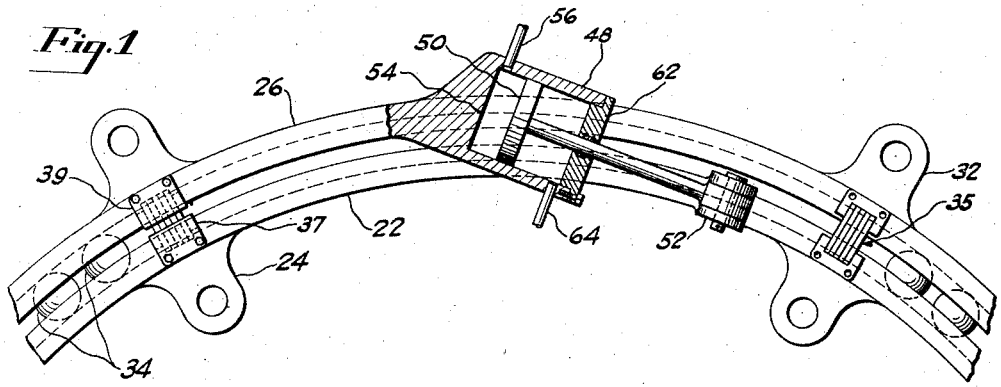
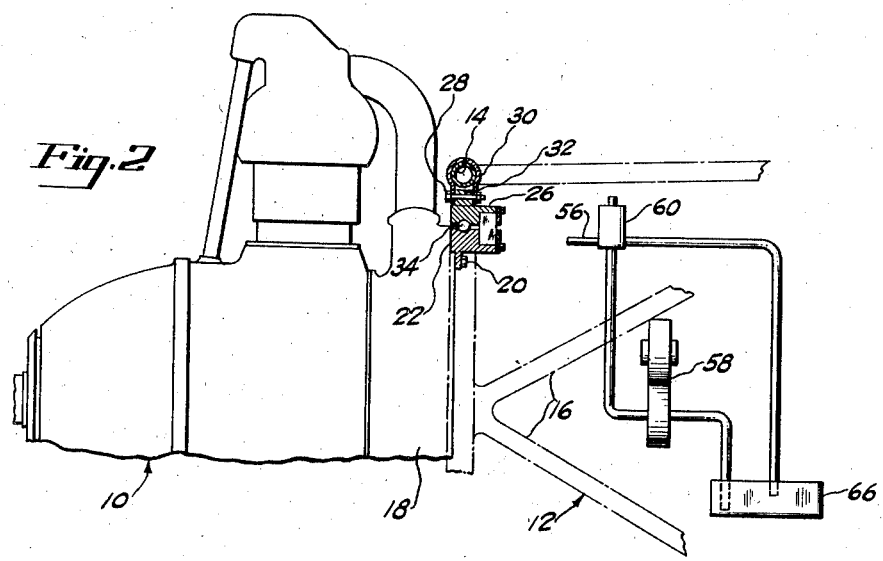
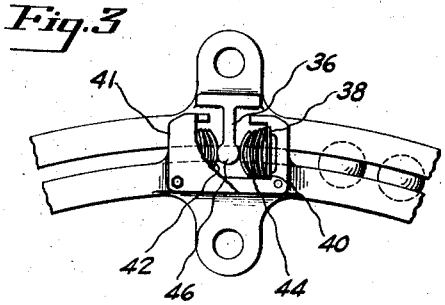
INVENTOR
*Robert E. McIntosh*
BY *Harris G. Luther*
ATTORNEY Patented Apr. 15, 1941

2,238,179

UNITED STATES PATENT OFFICE 2,238,179

ADJUSTABLE ENGINE MOUNT

Robert E. McIntosh, Manchester, Conn., assignor to United Aircraft Corporation, East Hartford, Conn., a corporation of Delaware Application June 23, 1939, Serial No. 280,789

11 Claims. (Cl. 248—5)

This invention relates to improvements in engine mounts and has for an object the provision of an improved mount for suppressing engine vibration and isolating such vibration from the engine supporting structure.

A further object resides in the provision of an improved engine mount which combines the action of resilient cushions and hydraulic friction to suppress and isolate the engine vibration.

A still further object resides in the provision of a flexible engine mount of controllable stiffness by means of which the proper flexibility of the engine support to suppress vibrations of a particular frequency or range of frequencies can be determined.

Other objects and advantages will be more particularly pointed out hereinafter or will become apparent as the description proceeds.

In the accompanying drawing, in which like reference numerals are used to designate similar parts throughout, there is illustrated a suitable mechanical arrangement for the purpose of disclosing the invention. The drawing, however, is for the purpose of illustration only and is not to be taken as limiting or restricting the invention as it will be apparent to those skilled in the art that various changes in the illustrated construction may be resorted to without in any way exceeding the scope of the invention.

In the drawing,

Fig. 1 is an elevational view of a fragmentary portion of an engine mount constructed according to the invention, a portion being shown in section to better illustrate the construction thereof.

Fig. 2 is an elevational view of an engine and engine supporting structure showing in cross-section the application of the improved engine mounting ring thereto, and Fig. 3 is a view of a fragmentary portion of the engine mount shown in Fig. 1 showing the application thereto of a modified form of device for resiliently resisting relative movement between the engine and its support.

Referring to the drawing in detail, the numeral 10 generally indicates an internal combustion engine, such as a radial air cooled engine conventionally employed for the propulsion of aircraft. It is to be understood, however, that the particular engine is illustrated only by way of example and that the improved engine mount is applicable to various installations in which it is desired to suppress and isolate torsional vibration between a body and its supporting structure. The numeral 12 generally indicates the engine supporting structure which may include an annular mounting ring 14 more or less rigidly attached to an engine carrying vehicle, not illustrated, by a suitable frame comprising the struts 16. The engine illustrated is provided with a blower section 18 provided with apertures which receive the engine securing bolts 20. An inner ring 22 in the form of an annular ball bearing race is rigidly secured to the engine blower section 18 by the bolts 20 passing through suitable attaching means such as the apertured lugs 24 formed integrally with or rigidly secured to the inner portion of the ring. An outer ring 26, also in the form of an annular ball bearing race, is rigidly secured to the mounting ring 14 by suitable means, such as the bolts 28 extending through apertured ears 30 secured to the ring 14 and apertured lugs 32 secured to or formed integrally with the outer edge of the ring 26. Bearing balls 34 are disposed in respective grooves in the juxtaposed surfaces of the radially aligned rings 22 and 26 so that the inner ring may rotate freely relative to the outer ring while transmitting the loads incident to the weight of the engine to the outer ring and the mounting ring 14.

Torque developed by the engine and torsional vibrations incident to engine operation tend to rotate the engine and inner ring 22 relative to the outer ring 26 and support 14. In order to suppress the torsional vibrations a small amount of relative freedom of movement between the engine and its support is necessary, this freedom of movement, however, obviously must be limited in order that the engine mount shall support the engine against the reaction to the engine torque. This condition requires some form of resilient connection between the engine and its support which connection may take the form, in the illustrative construction shown, of spring devices 35 connected between the rings 22 and 26. In order to obtain the proper stiffness in the mount between the engine and the support for any particular installation, or to determine the proper flexibility of the support for a particular engine, the resilient connections may conveniently be made softer or more flexible than required and suitable means provided for preloading the flexible connections until the proper stiffness is obtained. Such an arrangement may include one or more variable ratio springs for resiliently opposing the tendency of the engine torque to rotate the engine relative to its support and a hydraulic device acting in the same direction as the engine torque reaction to preload the springs until the proper stiffness of the mount is obtained. In the form of mount particularly shown in Fig. 1 a plurality of spring packs 35 connected at their opposite ends respectively to the rings 22 and 26. Each spring pack 35 may conveniently comprise a relatively thick pack of leaf springs constituting a rectangular block having one end clamped in a socket provided on the ring 22 and the other end clamped in a socket on the ring 26 and maintained in position by cover plates 37 and 39 removably secured to the respective sockets. Such spring packs have the characteristic that after a relatively small amount of initial distortion the stiffness increases rapidly with further distortion and the spring pack becomes substantially unyielding when the planes of the individual leaf springs become substantially perpendicular to the lines of force acting between the two end sockets so that the stiffness of the mount can be made substantially infinite, or the mount rendered solid if the preload is made sufficiently high.

One of the rings, such as the outer ring 26 is also provided with a cylinder 48 which may be rigidly secured thereto or formed integrally therewith. A piston 50 is reciprocable in the cylinder 48 and connected by means of a pivotal connection 52 with the other ring so that the piston reciprocates in the cylinder whenever there is any relative rotational movement between the rings 22 and 26. The space between the piston 50 and the closed or head end 54 of the cylinder is connected by means of a conduit 56 with a suitable source of hydraulic fluid under pressure, such as the engine lubricating system to which fluid is supplied by the pump 58 under pressure controlled by the relief valve 60. The opposite end of the cylinder may be open, or may be closed by a closure member 62, as illustrated, and the space between the piston and this closure member may be connected by a suitable conduit 64 with the engine oil sump 66 so that any fluid, such as engine lubricating oil, leaking past the piston will not be lost but will be returned to the engine. By this arrangement a load can be maintained in one direction on the springs at all times so that movement of the ring 22 in one direction relative to the ring 26 will be resisted only by a preloaded spring while movements in the opposite direction will be resisted by the force exerted on the piston 50 by the hydraulic fluid. The conduit 56 may also be arranged to provide a restriction to the flow of fluid to and from the space between the piston and the head end of the cylinder to provide an effective fluid damping to movements of the piston in the cylinder thereby materially reducing both the amplitude and frequency of the vibrational forces which tend to move the inner ring relative to the outer ring.

In the modified form of the invention shown in Fig. 3, one of the rings, for example, the inner ring 22 is provided along one side thereof with angularly spaced integral box structures as indicated at 41. This box structure has an opening in the outer side thereof through which projects an abutment 36 formed integrally with or rigidly secured to one side of the other ring member such as the outer ring member 26. The end walls of the box structure 34 are provided with recesses which provide an inner and an outer shoulder inside the box structure at each end thereof, as indicated at 38 and 40. Resilient spring packs, as indicated at 42 and 44, are disposed within each box structure 41 upon each side of the corresponding abutment 36 with their inner and outer ends bearing against the shoulders 40 and 38 as shown. The individual springs of these spring packs may have different curvatures so that the spring rate of the spring pack increases as the springs are compressed. The abutment 36 may be provided with an end portion 46 of generally cylindrical form which bears against the intermediate portions of the oppositely disposed spring packs 42 and 44 between the shoulders 38 and 40. With this arrangement movements of the rings 22 in either direction relative to the fixed ring 26 will be resisted by the spring packs 42 and 44 at varying rates depending on the amount of relative movement, one pack acting to resist relative rotation in one direction while the other acts to resist the relative rotation in the other direction. These spring packs may be preloaded by some suitable means such as the hydraulic device described above to provide any desired degree of stiffness in the resilient connection between the two rings, and may be provided in sufficient number spaced around the rings to provide the necessary reaction to the torsional forces tending to rotate the ring 22 relative to the ring 26. The mount may be made solid in this case by preloading the springs until the packs become solid and bottom against the end of the retainer.

While the invention is not limited to any particular form of resilient device it is highly desirable that the devices used have a variable spring rate in order that the stiffness of the mount shall change with changes in the preloading and it is also desirable that such devices have a limiting or bottoming position or be provided with some form of positive stops in order that the mount may be made substantially rigid for low engine speed operations.

While a suitable mechanical embodiment for the purpose of disclosing the invention has been hereinabove described and illustrated in the accompanying drawing it is to be understood that the invention is in no way limited to the particular arrangement so illustrated and described, but that various changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A vibration suppressing engine mount comprising, a pair of relatively movable elements one of which is rigidly supported and the other of which supports the engine, anti-friction means maintaining said elements in engine supporting relation while permitting relative movement therebetween incident to engine vibration created forces, means resiliently resisting relative movement between said elements, and means for exerting a force between said elements in a direction to increase the stiffness of said resisting means to relative movement between said supporting elements.

2. A vibration suppressing engine mount comprising, a pair of relatively movable elements one of which is supported by an engine carrying frame and the other of which supports the engine, means retaining said elements in engine supporting relation while permitting relative movement therebetween in at least one direction, one or more variable rate spring elements operatively connected between said elements to resiliently resist said relative movement, and means exerting a force on said elements to change the spring force exerted against said relative movement.

3. A vibration suppressing engine mount comprising, a pair of relatively movable elements one of which is rigidly supported and the other of which supports said engine, means retaining said supports in engine supporting relation while permitting limited resiliently restricted movement therebetween said means including variable rate spring elements connected between said elements providing a solid condition for said support at at least one end of the range of said limited freedom of relative movement, and means for applying a controllable force to said spring elements to vary said range of relative movement and the spring force opposing said relative movement.

4. A vibration suppressing engine mount comprising, a pair of relatively movable elements one of which is rigidly supported and the other of which supports said engine, means retaining said supports in engine supporting relation while permitting limited resiliently restricted movement therebetween said means including variable rate spring elements connected between said elements providing a solid condition for said support at at least one end of the range of said limited freedom of relative movement, and means for applying a controllable force to said spring elements to vary said range of relative movement and the spring force opposing said relative movement, said force applying means being effective to exert sufficient force to bring said elements to the end of said range of relative movement and render said mount substantially solid.

5. A vibration suppressing engine mount comprising, at least one pair of relatively movable elements one of which is supported by the engine carrying frame and the other of which supports the engine, means retaining said elements in engine supporting relation while permitting relative movement therebetween in at least one direction, one or more variable rate spring elements operatively connected between said elements to resiliently resist said relative movement and limit the range thereof, and means also operatively connected between said elements for exerting a force in a direction to assist said relative movement in said one direction and to oppose said relative movement in the opposite direction.

6. A vibration suppressing engine mount comprising, at least one pair of relatively movable elements one of which is supported by an engine carrying frame and the other of which supports said engine, means including a resilient element connecting said relatively movable elements to maintain said elements in engine supporting relation and resiliently oppose relative movement therebetween, a positive stop for limiting said relative movement comprising an abutment on each of said elements, and controllable means for temporarily maintaining said relatively movable elements against relative movement by bringing said abutments into contact.

7. A resilient engine mount comprising, a pair of concentric rings attached one to the engine and the other to an engine support, anti-friction means between said rings to render said engine attached ring freely rotatable relative to said support attached ring, a spring carried by one ring and engaged by the other ring, a cylinder attached to one ring, and a piston reciprocable in said cylinder and connected to the other ring.

8. A resilient engine mount comprising, a pair of concentric rings attached one to the engine and the other to an engine support, anti-friction means between said rings for holding said rings in engine supporting position with respect to each other while permitting relatively free rotation of the engine attached ring relative to the support carried ring, a plurality of spring packs carried by one ring, a plurality of abutments on the other ring engaging said spring packs whereby said spring packs act to resiliently oppose rotation of said engine carrying ring relative to said support carried ring, and means for damping the resilient action of said spring packs comprising, a hydraulic cylinder carried by one of said rings, a piston reciprocable in said cylinder and connected to the other of said rings and a conduit for leading hydraulic fluid under pressure to and from the space in said cylinder at one side of said piston.

9. A resilient engine mount comprising, a pair of concentric rings attached one to the engine and the other to an engine support, anti-friction elements between said rings for retaining said rings in engine supporting relation while permitting relatively free rotation of said engine carrying ring with respect to said support attached ring, a plurality of spring packs carried by one of said rings and constructed to provide damping of relative movements between said rings by internal friction in said spring packs, abutments carried by the other of said rings engaging said spring packs, and additional damping means between said rings comprising a hydraulic cylinder carried by one of said rings, a piston reciprocable in said cylinder and attached to the other of said rings, and a restricted passage for hydraulic fluid leading to the space within said cylinder at one side of said piston.

10. In combination with an engine and an engine mount, a vibration suppressing connection between said engine and said mount comprising, a pair of concentric rings attached one to said engine and one to said support, anti-friction elements between said rings for retaining said rings in engine supporting relation while permitting relatively free rotation of said engine supporting ring with respect to said support attached ring, a plurality of spring packs carried by one of said rings, a plurality of abutments carried by the other ring engaging said spring packs to resiliently resist relative rotation of said engine supporting ring with respect to said support attached ring, a hydraulic expansion chamber device operatively connected between said rings to preload said spring packs in one direction when supplied with hydraulic fluid under pressure.

11. In combination with an engine, an engine mount and a source of hydraulic fluid under pressure, a vibration suppressing connection between said engine and said engine mount comprising, a pair of concentric rings attached one to said engine and one to said mount, anti-friction elements between said rings for maintaining said rings in engine supporting relation while permitting relatively free rotation of said engine attached ring with respect to said mount attached ring, a plurality of spring packs carried by one of said rings, a plurality of abutments carried by the other of said rings and engaging said spring packs to resiliently resist relative movements of said rings, and a hydraulic expansible chamber device operatively connected between said rings to preload said spring pack in one direction and dampen relative movements between said rings by hydraulic friction, and means connecting said source of hydraulic fluid under pressure with said expansible chamber device, said means including a restricted aperture for the passage of hydraulic fluid to and from said device.

ROBERT E. McINTOSH.